United States Patent [19]

Imanishi et al.

[11] Patent Number: 5,444,558
[45] Date of Patent: * Aug. 22, 1995

[54] SPATIAL LIGHT MODULATOR WITH PHOTOCONDUCTOR OF HYDROGENATED AMORPHOUS SILICON WITH 0.1-1.0 PPM BORON

[75] Inventors: Dai Imanishi; Nozomu Ohkouchi, both of Yokosuka; Kazushige Ohtawara, Kyoto; Hiroyuki Natsuhori, Kamakura; Shigeo Shimizu, Yokohama; Toshio Konno, Hoya; Masanobu Shigeta, Yokosuka; Hiromitsu Takenaka, Yokosuka; Tadayuki Shimada, Yokosuka, all of Japan

[73] Assignee: Victor Company of Japan, Ltd., Yokohama, Japan

[*] Notice: The portion of the term of this patent subsequent to Oct. 4, 2011 has been disclaimed.

[21] Appl. No.: 77,559

[22] Filed: Jun. 15, 1993

Related U.S. Application Data

[63] Continuation-in-part of Ser. No. 977,613, Nov. 17, 1992, Pat. No. 5,353,139.

[30] Foreign Application Priority Data

Jun. 16, 1992 [JP] Japan ................... 4-181836

[51] Int. Cl.⁶ ............................................. G02F 1/135
[52] U.S. Cl. ........................................................ 359/72
[58] Field of Search ............................. 359/72; 430/95

[56] References Cited

U.S. PATENT DOCUMENTS

| | | | |
|---|---|---|---|
| 4,289,822 | 9/1981 | Shimada et al. | 428/212 |
| 4,925,276 | 5/1990 | McMurray, Jr. et al. | 359/72 |
| 4,960,662 | 10/1990 | Nishikawa et al. | 430/64 |
| 5,056,897 | 10/1991 | Akiyama et al. | 359/72 |
| 5,182,624 | 1/1993 | Tran et al. | 257/40 |
| 5,231,282 | 7/1993 | Nishi et al. | 359/72 |
| 5,233,450 | 8/1993 | Hatano et al. | 359/72 |
| 5,235,195 | 8/1993 | Tran et al. | 257/59 |
| 5,262,262 | 11/1993 | Yagi et al. | 430/66 |
| 5,272,554 | 12/1993 | Ji et al. | 359/72 |
| 5,273,910 | 12/1993 | Tran et al. | 437/3 |
| 5,353,139 | 10/1994 | Ohkouchi et al. | 359/72 |

FOREIGN PATENT DOCUMENTS

| | | |
|---|---|---|
| 58-199327 | 11/1983 | Japan . |
| 58-215626 | 12/1983 | Japan . |
| 62-242919 | 10/1987 | Japan . |
| 62-057016 | 11/1987 | Japan . |
| 2-083534 | 3/1990 | Japan . |
| 2-140723 | 5/1990 | Japan . |
| 2-154229 | 6/1990 | Japan . |
| 2-256026 | 10/1990 | Japan . |
| 2-262613 | 10/1990 | Japan . |

OTHER PUBLICATIONS

Ashley et al, "Amorphous Silicon Photoconductor in a Liquid Crystal Spatial Light Modulator", Applied Optics, vol. 26, No. 2 (Jan. 1987), pp. 241-246.

Preprint for the 51st Meeting (1990) of the Japan Society of Applied Physics, p. 743, a paper 29a-MF-2 is introduced, by Hatano et al.

Preprint for the 17th Liquid Crystal Panel Discussion (1991) under the joint auspices of the Japan Society of Applied Physics the Society of Polymer Science, Japan, and the Chemical Society of Japan, a paper 4F108 is introduced.

Primary Examiner—Anita Pellman Gross
Attorney, Agent, or Firm—Michael N. Meller

[57] ABSTRACT

A spatial light modulator capable of displaying a good contrast and high resolution moving pictures without an after-image effect is disclosed. The modulator comprises a pair of transparent electrodes for generating an electric field therebetween and at least a photoconductive member and a photo modulation member being laminated and interposed between the transparent electrodes, the photoconductive member is a film having a thickness ranged from 10 μm to 30 μm and is made of hydrogenated amorphous silicon doped with boron such that an amount of the boron with respect to silicon in the hydrogenated amorphous silicon in atomic percent is, 0.1 to 1.0 ppm. To enhance the modulator performance, a thickness of the photoconductive member is so selected to have light absorptance ranged 70% to 95% at a wavelength of a writing light which writes information in the modulator.

1 Claim, 7 Drawing Sheets

Fig. 13

SPATIAL LIGHT MODULATOR WITH PHOTOCONDUCTOR OF HYDROGENATED AMORPHOUS SILICON WITH 0.1-1.0 PPM BORON

FIELD OF THE INVENTION

The present invention is a Continuation-In-Part application of U.S. Ser. No. 977,613 filed on Nov. 17, 1992, now U.S. Pat. No. 5,353,139, and relates to a spatial light modulator which comprises a photoconductive member and a photo modulation member and is adapted to be used in an optical information processing device-/or parallel processing of a moving image or still image and for display and storage thereof and, particularly, to an improvement of the photoconductive member thereof.

DESCRIPTION OF THE RELATED ART

Background of the Invention

An example of a spatial light modulator to be used in image processing, a liquid crystal light-valve element is disclosed in Japanese Patent Laid-Open No. 58-199327/1983. The purpose of the liquid crystal light-valve element in this prior art is to obtain a high resistance, high sensitivity photoconductive member and the liquid crystal light-valve is composed of an amorphous silicon layer, a lightblocking layer and a liquid crystal layer arranged in the order. The amorphous silicon (a—Si) layer corresponding to the photo-conductive member is doped with boron at any density selected from a range from 10 ppm (parts per million) to 400 ppm depending upon variation of Fermi level thereof.

In order to implement such spatial light modulator, it is essential to improve sensitivity of photo-conductive member to a writing light and to increase a degree of modulation of light modulation member corresponding with the improved writing sensitivity. In general, a thickness of photoconductive member for conventional spatial light modulators is determined by taking an impedance balance with that of the light modulator into account and it is said that the thickness should be larger than that of the light modulator. Since the thickness of the light modulator is usually about 5 μm, film thickness of a photoconductive member of hydrogenated amorphous silicon (a—Si:H) becomes about 5-6 μm.

On the other hand, in the Presentation Preprint, page 753, 26a-H-7 of the Applied Physics Society of Japan, 1990 Autumn, there disclosed a spatial light modulator having an improved sensitivity. According to the disclosed technology, an STN liquid crystal is used and a film thickness of photoconductive member of amorphous silicon is as thin as 3 μm.

Also in page 753, 26a-H-9 of the same publication, a hologram technology using a spatial light modulator is disclosed. According to the technology, a film thickness of photo-conductive member of amorphous silicon is as thin as 3 μm.

These conventional techniques have following drawbacks:

(1) In the conventional technique disclosed in Japanese Patent Laid-Open No. 58-199327/1983, an application of drive voltage to the light modulator member is delayed since the response speed of amorphous silicon material to light is not necessarily high. Such response delay may be acceptable to a defect test instrument as disclosed in the publication, but due to its after-image phenomena, it is not applicable to a system for displaying moving images in good quality.

(2) Although it intends to improve the sensitivity by merely balancing respective impedances of the photoconductive member and the light modulator member between them, it is practically very difficult to balance the respective impedances of these members due to characteristics deviations of the individual members. In view of this point, the photoconductive member itself is desired to be highly sensitive. However, when the photoconductive member is made thin as disclosed in the aforementioned Preprint, efficiency of light utilization is lowered hence the sensitivity is reduced since it can not absorb a writing light sufficiently, although its resolution may be improved.

SUMMARY OF THE INVENTION

In view of the above mentioned state of the prior art, a first object of the present invention is to provide a spatial light modulator capable of displaying good contrast and resolution moving pictures without an after-image problem.

A second object of the present invention is to provide a spatial light modulator capable of improving sensitivity thereof independent of a photo modulation member associated therewith.

A third object of the present invention is to provide a spatial light modulator having an adequate characteristics for practical use.

In order to achieve the above objects, a spatial light modulator according to an embodiment of the present invention which is constructed by a lamination of at least a photoconductive member and a photo modulation member being interposed between transparent electrodes which generates a driving electric field, and the photoconductive member is a film having a thickness in a range from 10 μm to 30 μm made of hydrogenated amorphous silicon doped with boron such that an amount of the boron with respect to silicon in the hydrogenated amorphous silicon in atomic percent is 0.1 to 1.0 ppm. With these ranges of the film thickness and the dopant amount, an improved sensitivity is obtained and a response time to light, a fall time in particular is shortened hence the after-image effect is reduced.

Another embodiment of the present invention is to provide a spatial light modulator in which a thickness of the photoconductive member is so selected to have light absorptance ranged 70% to 95% at a wavelength of a writing light which writes information in the modulator to enhance a spatial light modulator's performance.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

Embodiments of spatial light modulator according to the present invention will be described with reference to the accompanying drawings.

First Embodiment

Figure 1:
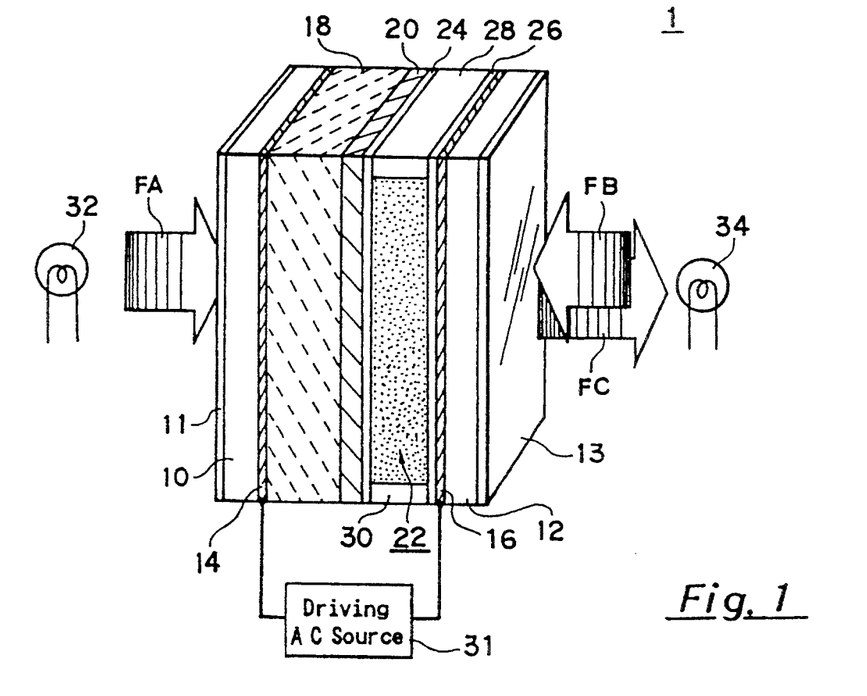
FIG. 1 shows a construction of a spatial light modulator according to an embodiment of the present invention.

A first embodiment will be described with reference to FIGS. 1 to 7. FIG. 1 schematically shows a construction of a spatial light modulator 1 according to the first embodiment of the present invention, a first substrate 10 of transparent glass with a first anti-reflection film 11 is provided to oppose a writing light source 32, and a second substrate 12 of transparent glass with a second anti-reflection film 13 is provided to oppose a reading light source 34. Further, transparent electrodes 14 and 16 are provided respectively on the first and second substrates 10 and 12 at their respective sides opposite to the first and second anti-reflection films 11 and 13. A photoconductive member 18 of hydrogenated amorphous silicon, a dielectric mirror layer 20 and a photo-modulation layer 22 of liquid crystal are laminated in the order and interposed between the transparent electrodes 14 and 16.

Describing the construction in more detail, the transparent electrode 14 is formed first on the first substrate 10, then the photoconductive member 18 and the dielectric mirror layer 20 are formed thereon in lamination. On the other hand, the transparent electrode 16 is formed on the second substrate 12. Aligning films 24 and 26 are formed on the dielectric mirror layer 20 and the transparent electrode 16 respectively, and laminations respectively carrying the first and second substrates 10 and 12 are assembled with spacers 28 and 30 interposed therebetween to form a cell in which liquid crystal is filled to constitute the photo-modulation layer 22. An A.C. driving power source 31 is connected between the transparent electrodes 14 and 16.

The transparent electrodes 14 and 16 may be of, for example, ITO (indium tin oxide) or $SnO_2$ (stannic dioxide). The photoconductive member 18 may be formed of hydrogenated amorphous silicon "a—Si:H" or amorphous silicon carbide "a—$Si_xC_{1-x}$:H" ($x<1$) by CVD. In this embodiment, the photoconductive member 18 is formed of hydrogenated amorphous silicon film having a thickness of 10 to 30 μm deposited by plasma CVD, as will be described later. Atomic percent of impurity boron (B) to silicon in the hydrogenated amorphous silicon film is 0.1 to 1.0 ppm.

The dielectric mirror layer 20 prepared by alternatively laminating, for example, silicon (Si) films and silicon dioxide ($SiO_2$) films, or titanium dioxide ($TiO_2$) films and silicon dioxide films, by vapor deposition. Further, the photo modulation layer 22 is of an N type nematic liquid crystal having DAP (Deformation of Vertical Aligned Phases) characteristics exhibiting birefringence varying in response to the electric field applied thereto, which electric field is modulated according to the intensity distribution of a writing light on the photoconductive member 18. The aligning films 24 and 26 may be made of, for example, silicon dioxide film deposited by angled evaporation. The A.C. driving power source 31 is used to apply an A.C. driving voltage across the transparent electrodes 14 and 16. Provision of the first and second anti-reflection films 11 and 13 is optional.

In operation, the A.C. voltage having a rectangular waveform is applied preliminary across the transparent electrodes 14 and 16 of the spatial light modulator 1 constructed as mentioned above from the AC power source 31. The voltage is applied to the photoconductive member 18, the dielectric mirror layer 20 and the photo-modulation layer 22 and is divided in accordance with their respective impedances. When the writing light containing image information is directed from the writing light source 32 to the spatial light modulator 1 as shown by an arrow FA under the above condition, it passes through the first anti-reflection film 11, the first substrate 10 and the transparent electrode 14 to the photoconductive member 18, as the writing light is absorbed therein, it causes an impedance reduction of the photoconductive member 18 proportionally to the intensity of the writing light. With the reduced impedance of the photoconductive member 18, the driving voltages respectively applied to the respective photo modulation member 22 and the dielectric mirror layer 20 are increased. That is, an electric field modulated corresponding to a sectional intensity distribution of the writing light is applied to the photo-modulation layer 22.

Since the photo modulation layer 22 is formed of N-type nematic liquid crystal, there develops birefringence in the photo modulation layer 22 corresponding to the modulated electric field applied thereto. Under this condition, when the reading light is directed to the spatial light modulator 1 as shown by an arrow FB, the reading light passes through the second anti-reflection film 13, the second substrate 12 and the transparent electrode 16 to the photo modulation layer 22. The reading light is modulated by the birefringence effect of the liquid crystal corresponding to the sectional intensity distribution of the writing light, then is reflected by the dielectric mirror layer 20 and outputted from the spatial light modulator 1 traveling backward along its entering path as shown by an arrow FC. Thus, the image information written in the spatial light modulator 1 by the writing light is read out.

The wavelength of the writing light is so selected that the photoconductive member 18 responds i.e. sensitive to the writing light by changing its impedance. On the other hand, the reading light has generally the same wavelength as that of the writing light. However, the reading light may have any other wavelength than that of the writing light so long as it can be modulated by the photo modulation layer 22.

The photoconductive member 18 of this embodiment will be described in detail with reference to FIGS. 2 to 7. The sensitivity of the spatial light modulator 1 to the writing light depends upon its impedance change rate of the photoconductive member 18, that is, a changing rate of impedance thereof before and after the light irradiation, that is a gradient of an applied voltage to transmittance curve of the photo-modulation member 22 (referred to as "γ") and an impedance matching between the respective layers. Therefore, an improvement of the sensitivity of hydrogenated amorphous silicon forming the photoconductive member 18 leads to an improvement of the contrast ratio of an image displayed, and an improvement of the impedance changing speed of the hydrogenated amorphous silicon material to light provides a better effect for a moving picture display.

Figure 2:
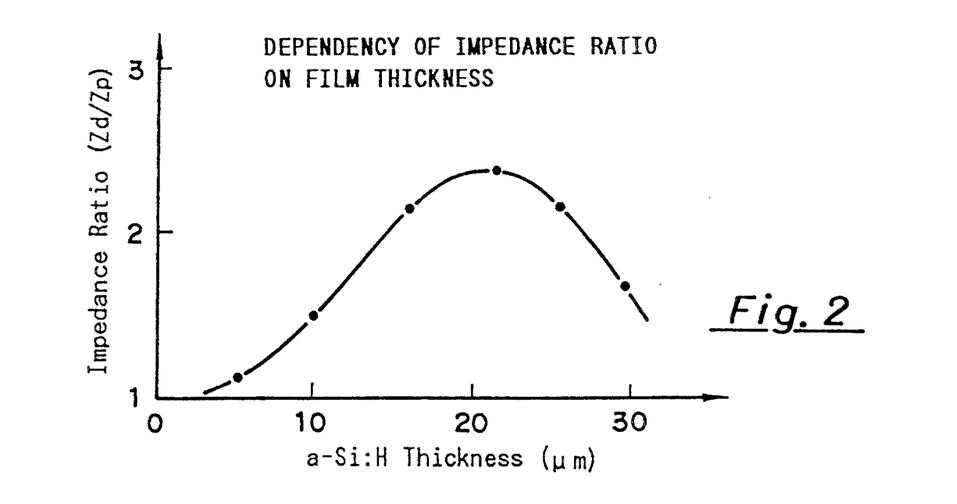
FIG. 2 is a graph showing a dependency of sensitivity on a film thickness of a photoconductive member of the spatial light modulator in FIG. 1.

FIG. 2 is a graph showing a dependency of sensitivity on a film thickness of the photoconductive member 18 of hydrogenated amorphous silicon sample measured at room temperature under conditions of doping amount of boron to silicon of the hydrogenated amorphous silicon sample of 0.5 ppm in atomic percent, and of the wavelength and intensity of light from a measuring light source of 700 nm and 10 $\mu W/cm^2$, respectively, and the frequency of the driving power source 31 of 1 kHz (these conditions are commonly used in the measurements shown in FIGS. 3 to 6). According to the measurement result shown in FIG. 2, with the film thickness of 10 $\mu m$ and 30 $\mu m$, the impedance change is about 1/1.51 times, and with 20 $\mu m$, about ½ times. Therefore, it is clear that the hydrogenated amorphous silicon film having the thickness within a range from 10 to 30 $\mu m$ provides a preferable sensitivity.

Figure 3:
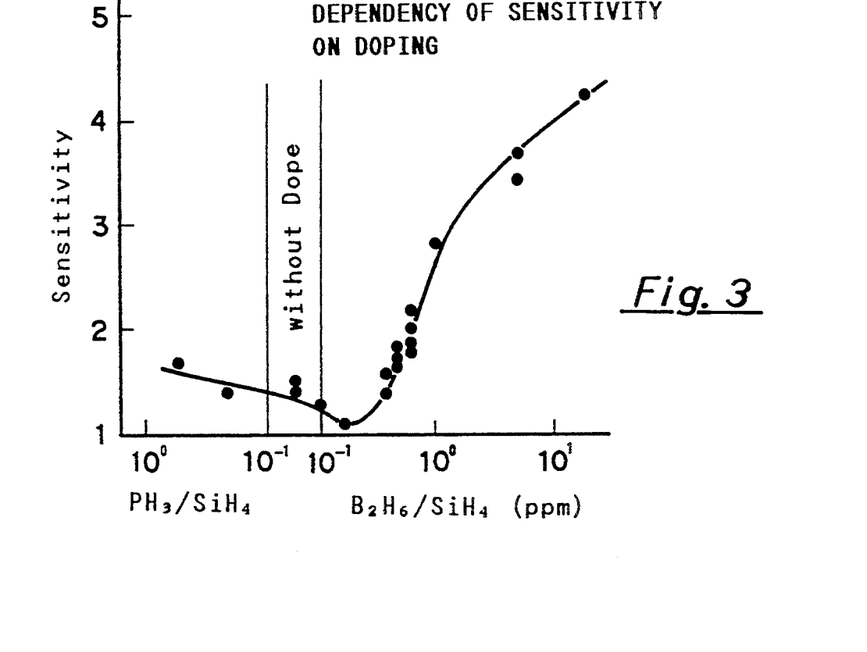
FIG. 3 is a graph showing a dependency of sensitivity on a dopant amount of the photoconductive member.

FIG. 3 is a graph showing a dependency of sensitivity on a dopant amount of the photoconductive member 18 of hydrogenated amorphous silicon sample. The film thickness of this sample was 15 to 18 $\mu m$. Abscissa is scaled in logarithm. It is clear from FIG. 3 that the sensitivity of hydrogenated amorphous silicon increases with the increase of concentration of $B_2H_6$ gas, that is, the amount of boron dopant.

Figure 4:
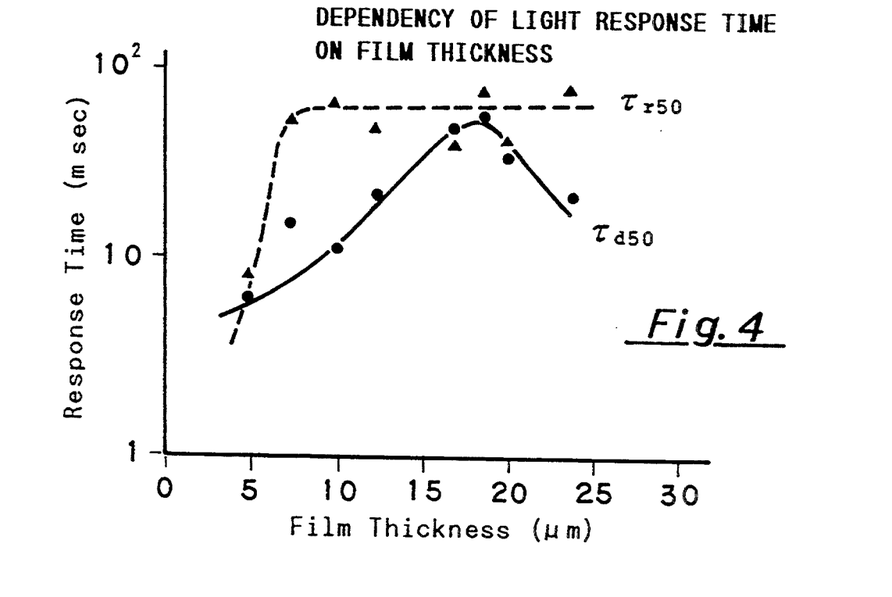
FIG. 4 is a graph showing a dependency of light response time on a film thickness of the photoconductive member.

FIG. 4 is a graph showing a dependency of light response time on a film thickness of the photoconductive member 18 of hydrogenated amorphous silicon sample. In FIG. 4, $\tau_{r50}$ and $\tau_{d50}$ are times required to rise from 0% up to 50% of a total change of impedance and to fall from the total impedance change (100%) down to 50% respectively. In the graph shown in FIG. 4, ordinate is scaled in logarithm. It is clear from FIG. 4 that the rise time $\tau_{r50}$ is relatively large for the film having thickness of about 6 $\mu m$ or more and decreases sharply for a smaller thickness than about 6 $\mu m$ and that the fall time $\tau_{d50}$ increases substantially linearly for the film thickness up to 18 $\mu m$ and decreases for a thicker film.

Figure 5:
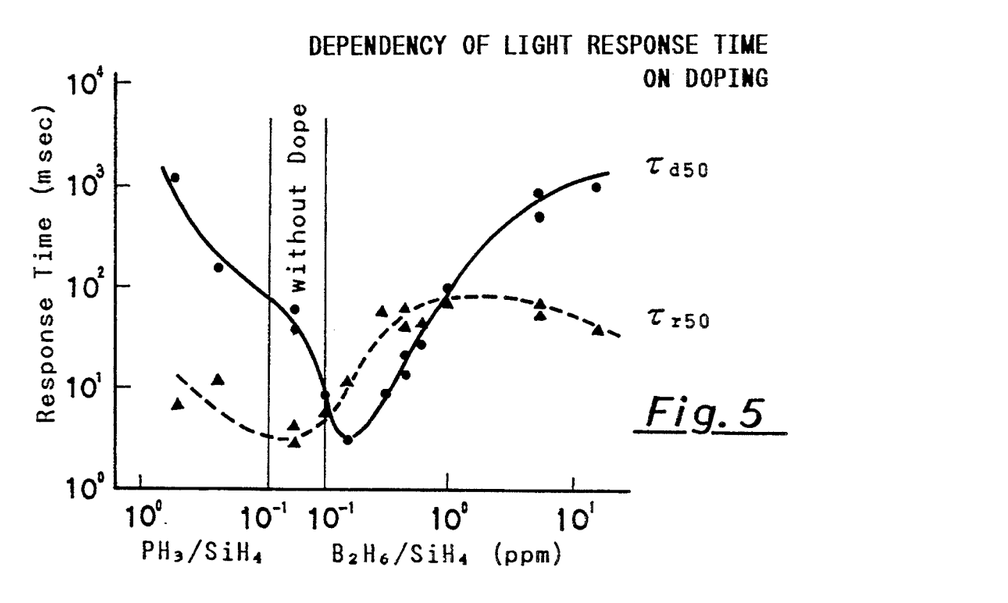
FIG. 5 is a graph showing a dependency of light response time on a dopant amount in the photoconductive member.

FIG. 5 is a graph showing a dependency of light response time on a dopant amount of the photoconductive member 18 of hydrogenated amorphous silicon sample. In FIG. 5, the graph is shown in logarithmic coordinates. Other conditions are the same as those used in FIG. 3. It is clear from FIG. 5 that the fall time $\tau_{d50}$ increases with the increase of amount of boron dopant while the rise time $\tau_{r50}$ has a peak around at 1.0 ppm. The change of the fall time $\tau_{d50}$ is more conspicuous compared to that of the rise time $\tau_{r50}$.

Figure 6:
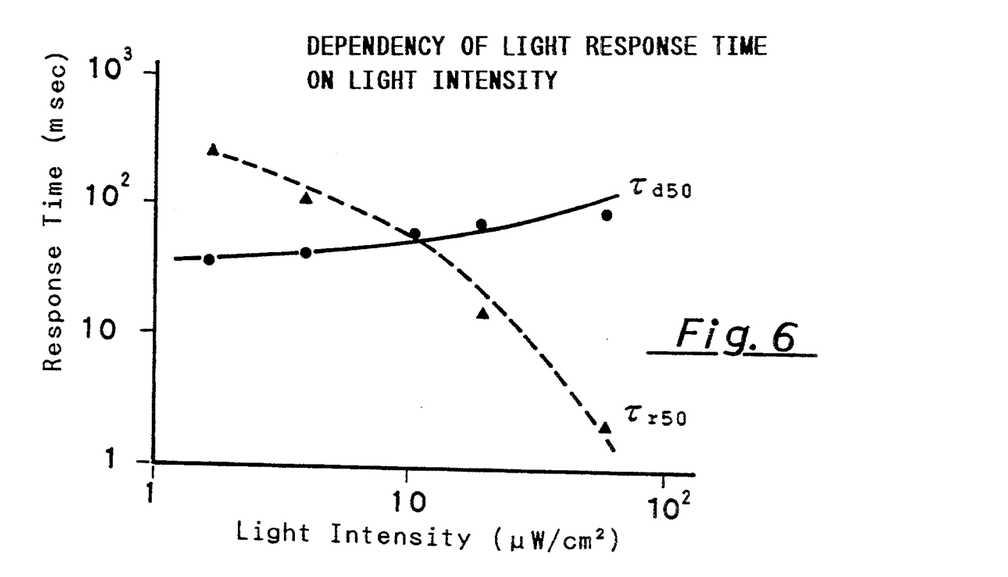
FIG. 6 is a graph showing a dependency of light response time on light intensity on the photoconductive member.

FIG. 6 is a graph showing a dependency of light response time on light intensity on the photoconductive member, which was measured under the same conditions as those used in FIG. 2. The graph is shown in logarithmic coordinates. It is clear from FIG. 6 that the rise time $\tau_{r50}$ is substantially in inverse-proportion to the light intensity and the fall time $\tau_{d50}$ is substantially in proportion to the light intensity.

The results shown in FIGS. 2 to 6 can be summarized as follows:

(1) With film thickness from 10 to 30 $\mu m$, a fairly good sensitivity can be obtained (see FIG. 2).

(2) Although the sensitivity and fall time $\tau_{d50}$ increase substantially linearly with the increase of amount of boron dopant, the rise time $\tau_{r50}$ has a peak around at 1.0 ppm (see FIGS. 3 and 5).

(3) There indicated the higher the sensitivity the longer the fall time $\tau_{d50}$ (see FIGS. 2 and 4), but the rise time reduces with the increase of light intensity (see FIG. 6). Further, the increase of fall time $\tau_{d50}$ in relation to the increase of light intensity, is slight (see FIG. 6).

Therefore, by optimizing the relation between the fall time $\tau_{d50}$ and the sensitivity by controlling the film thickness and the amount of dopant boron, it is possible to reduce the rise time $\tau_{r50}$ and the fall time $\tau_{d50}$ and to display a moving picture with a high contrast ratio.

As to the film thickness, it can be said that a good sensitivity can be obtained with a film thickness in the range from 10 $\mu m$ to 30 $\mu m$, preferably in a range from 15 $\mu m$ to 25 $\mu m$, as shown in FIG. 2. As to the amount of boron dopant according to FIG. 8, the sensitivity is improved with an increase of the amount of boron. This is preferable but from FIG. 5 the fall time $\tau_{d50}$ is increased with the increase of the amount of boron which is undesirable. Therefore, if the fall time is taken into consideration, the atomic percent of the boron dopant to silicon with which a substantially acceptable fall time is obtained, should be 1.0 ppm or less.

Figure 7A:
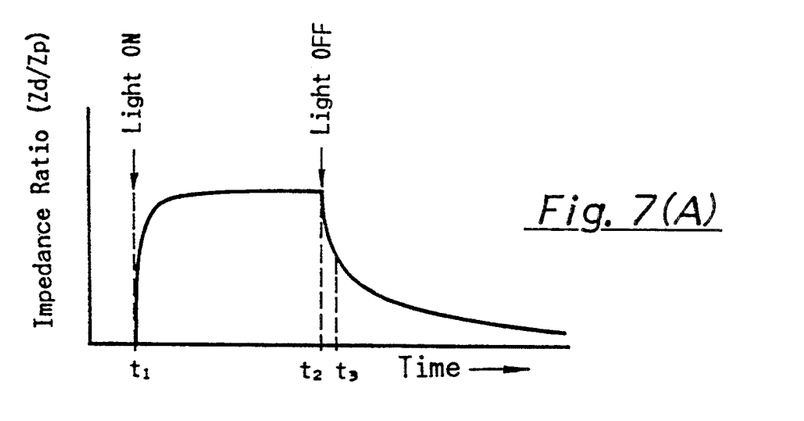
FIG. 7(A) shows an impedance variation of the photoconductive member without boron.
Figure 7B:
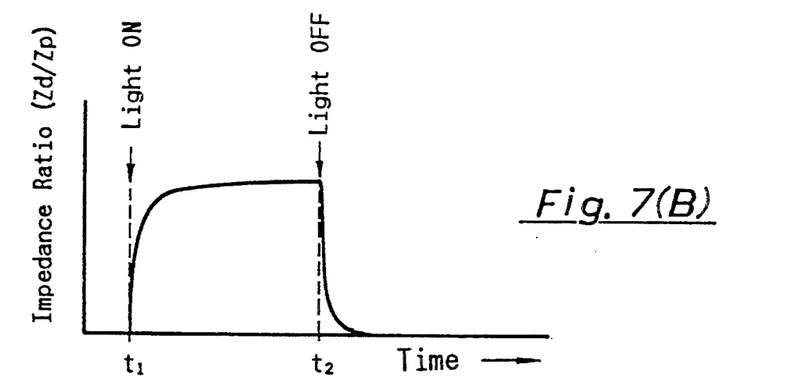
FIG. 7(B) shows an impedance variation of the photoconductive member with boron at 0.15 ppm.

However, when no boron doping is made, there are problems such as shown in FIGS. 7(A) and 7(B). FIGS. 7(A) and 7(B) show an impedance variation of the photoconductive member 18 without boron and with boron at 0.15 ppm, respectively, when the photoconductive member 18 is irradiated with a light (ON) and not irradiated (OFF). As shown in these figures, the impedance of the photoconductive member 18 having no boron dopant is changed sharply immediately after the light is cut off but thereafter it tails off gradually, which is undesirable.

In view of this fact, the film thickness range and the range of boron amount of the photoconductive member 18 formed of hydrogenated amorphous silicon are preferably 10 to 30 $\mu m$ and 0.1 to 1.0 ppm in atomic percent to Si, respectively. Particularly, since the fall time $\tau_{d50}$ becomes 30 to 50 m sec with a boron amount of 0.1 to 0.5 ppm, a moving image display in a television in which 20 to 30 images are processed per second becomes possible.

A sample of spatial light modulator 1 prepared according to this embodiment of the present invention will now be described. A photoconductive member 18 of hydrogenated amorphous silicon doped with boron was grown to a thickness of 16 μm on the transparent electrode 14 supported on the first substrate 10 by plasma CVD. In detail, the growth was performed by using silane ($SiH_4$) gas at a flow rate of 15 sccm (standard cubic centimeter per minute), hydrogen gas ($H_2$) at a flow rate of 60 sccm, and $B_2H_6$ gas flow rate (corresponding to atomic percent) of 1.0 ppm or less with respect to silane gas flow rate (that is, the flow rate of $B_2H_6$ gas being less than $1\times10^{-6}$ sccm to the silane gas flow rate of 1 sccm) under conditions of substrate temperature of 200° C. and a gas pressure of 133 Pa (1 Torr). In this example, the ratio of flow rate of $B_2H_6$ gas to silane gas was 0.4 ppm and the atomic percent of boron to silicon of hydrogenated amorphous silicon becomes 0.4 ppm.

In this case, the hydrogen content of hydrogenated amorphous silicon was about 10 to 20 atm %. The dielectric mirror layer 20 which was a lamination of a total of 13 alternately overlaid silicon layers and silicon dioxide layers was vapor-deposited on the photoconductive member 18. The transparent electrode 16 supported on the second substrate 12 was deposited by angled evaporation with silicon dioxide and laminated further with a silane coupling agent (for example, AY43-021 available from Toray-Dow Corning Silicone, Inc.).

Then, the two components respectively supported on the first and second substrates 10 and 12 were assembled with spacers 28 and 30 to form a cell of 3 μm thick which was filled with liquid crystal (for example, EN-38 available from Chisso Inc.).

An A.C. voltage having a driving frequency of 5 kHz was applied to the spatial light modulator thus constructed from the driving power source 31 and an image was written therein with the writing light having a wavelength of 700 nm and was read out with a reading light. An image having a contrast ratio 100:1 or more and resolution of 7 μm (70 lines/mm) was reproduced. The response time of this spatial light modulator 1 was such that the rise time of which the reading light intensity changes from 0% to 90% was 45 ms and the fall time of which the reading light intensity changes from 100% to 10% was 35 ms. Such values are sufficiently acceptable and it is confirmed that the spatial light modulator 1 is well suited for a moving picture display.

As described in the foregoing, according to this embodiment of the present invention, a high contrast ratio and high resolution display of moving pictures at a video signal rate is possible. Further in this embodiment, the thickness of the hydrogenated amorphous silicon film is 10 to 30 μm, its sensitivity becomes maximum with the writing light wavelength of 650 to 700 nm. Therefore, a laser diode or an LED array can be used as a writing light source, enabling miniaturization of a device in which the spatial light modulator is to be incorporated.

In the aforementioned co-pending U.S. patent application Ser. No. 977,613 from which this application is continued, it was described that the embodiment 1 described therein was prepared by taking its characteristics at room temperature into consideration, however it was later confirmed by evaluation made on a complete spatial light modulator that the preferable results described in the present application were obtainable under normal environment for operation even with a temperature rise caused by the operation of a system using the spatial light modulator of the present invention.

Second Embodiment

A second embodiment of the present invention will be described with reference to FIGS. 8 and 9. A construction of a spatial light modulator of the second embodiment is the same as that of the first embodiment. The second embodiment resides in a use of the spatial light modulator at a temperature higher than usual.

Figure 8:
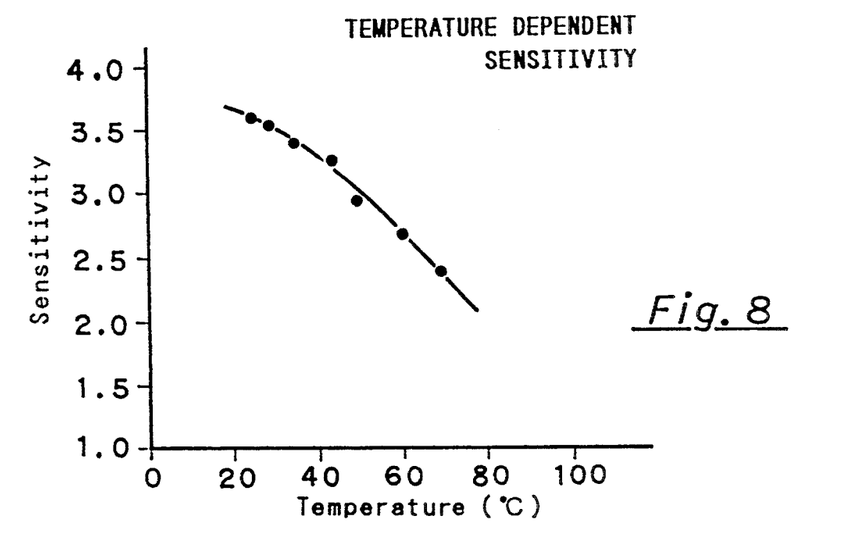
FIG. 8 is a graph showing a temperature dependent sensitivity of the photoconductive member.

FIG. 8 shows a temperature dependent sensitivity of the photoconductive member of hydrogenated amorphous silicon. An amount of boron dopant with respect to silicon in the photoconductive member 18 formed of hydrogenated amorphous silicon was 1.0 ppm in atomic percent, the thickness of the member was 17 μm and the wavelength and intensity of the writing light were 700 nm and 50 μW/cm², respectively. Frequency of the A.C. driving power source was 5 kHz (these conditions are used in the measurement result shown in FIG. 9). It is clear from FIG. 8 that the sensitivity is gradually lowered with increase of temperature. In fact, sensitivity of 3.6 at room temperature 25° C., was lowered to 2.9 at 50° C.

Figure 9:
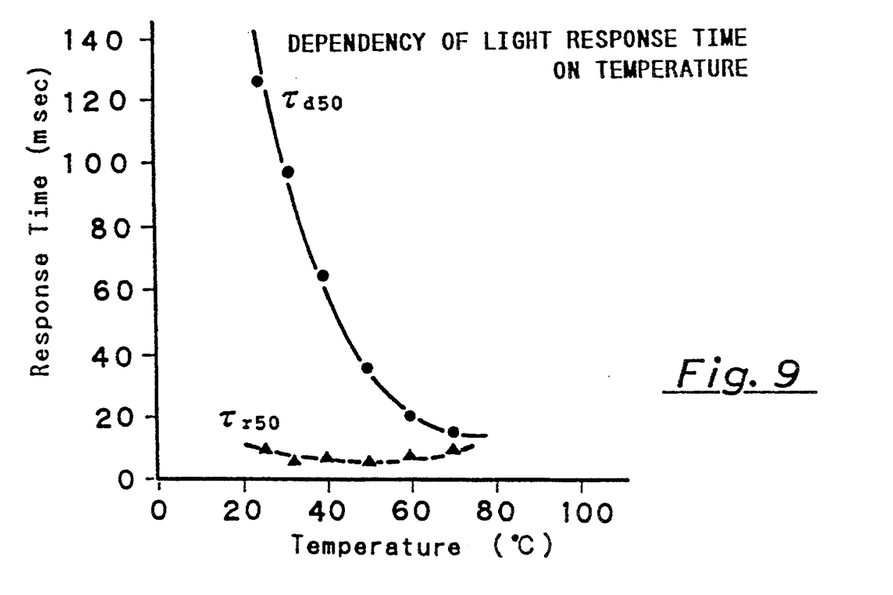
FIG. 9 is a graph showing a dependency of light response time on temperature of the photoconductive member.

FIG. 9 is a graph showing a dependency of light response time on temperature of the photoconductive member of hydrogenated amorphous silicon. Measurement conditions are the same as those used in FIG. 8. In this figure, the definition of rise time $\tau_{r50}$ and fall time $\tau_{d50}$ are as described with respect to FIG. 4. It is clear from FIG. 9 that, while the rise time $\tau_{r50}$ is 5 to 6 ms and has substantially no dependency on temperature, the fall time $\tau_{d50}$ is sharply reduced with an increase of temperature. For example, the fall time of 126 ms at 25° C. was reduced to 33 ms at 50° C.

From the above, it is clear that, although the sensitivity of the spatial light modulator 1 is lowered with the increase of temperature, the response time, particularly the fall time becomes shorter sharply with increase of temperature. Therefore, by positively increasing the operating temperature, it is possible to accelerate the response of the photoconductive member 18 and thus to obtain a desired characteristics for processing moving images. In such case, although sensitivity is lowered, the degree thereof is slight. Further, by increasing the amount of boron, it is possible to compensate for a sensitivity reduction. That is, it is enough to suitably establish conditions within the film thickness range from 10 to 30 μm and the range of boron amount from 0.1 to 1.0 ppm used in the first embodiment. As to the temperature, it is not recommendable to set it too high in view of the characteristics of the liquid crystal forming the photo modulation layer 22. About 40° C. may be preferable.

As described in the foregoing, it is possible to obtain a moving image display of high quality, that is, high contrast and resolution, by suitably selecting the amount of boron dopant in the photoconductive member to silicon in atomic percent in a range from 0.1 ppm to 1.0 ppm, preferably, in a range from 0.1 to 0.5 ppm, the thickness thereof in a range from 10 μm to 30 μm, preferably, in a range from 15 to 25 μm, and the operating temperature in the range from 30° C. to 70° C., preferably, in a range from 30° C. to 40° C.

The spatial light modulator 1 prepared for the second embodiment will now be described. The photoconductive member 18 of hydrogenated amorphous silicon doped with boron was grown to a thickness of 17 μm by plasma CVD on the transparent electrode 14 supported on the first substrate 10. In detail, the growth is performed by using silane ($SiH_4$) gas at a flow rate of 15 sccm, hydrogen gas ($H_2$) at a flow rate of 60 sccm and $B_2H_6$ gas at a flow rate of 0.1 to 1.0 ppm (corresponding to the atomic percent) with respect to silane gas under conditions of the substrate temperature of 200° C. and a gas pressure of 133 Pa (1 Torr). In this example, the atomic percent flow rate of $B_2H_6$ gas with respect to the silane gas was 1.0 ppm and the atomic percent of boron to silicon in the hydrogenated amorphous silicon becomes 1.0 ppm.

In this case, hydrogen content in the hydrogenated amorphous silicon was about 10 to 20 atm %. The dielectric mirror layer 20 was vapor-deposited on the photoconductive member 18. The dielectric mirror layer 20 was a lamination of total of 19 layers of which 7 silicon layers each having a thickness of λ/4 and 8 silicon dioxide layers each having a thickness of λ/4 are alternately laminated each other, and on each of the outermost silicon dioxide layer of the 15-layer lamination, one titanium dioxide layer having a thickness of λ/4 and one silicon dioxide layer having a thickness of λ/2 are further laminated in this order, so that a pair of the λ/2 silicon dioxide layers sandwiches the rest of the lamination.

The transparent electrode 16 supported on the second glass substrate 12 was deposited by angled evaporation with silicon dioxide and laminated further with a silane coupling agent as mentioned previously. Then, the two components respectively supported on the first and second substrates 10 and 12 were assembled with spacers 28 and 30 to form a cell of 3 μm thick which was filled with liquid crystal (for example, MLC-2010 available from Merck Japan Co.). This liquid crystal has a clearing point as high as about 92° C.

An AC voltage having a driving frequency of 5 kHz was applied from the driving power source 31 to the spatial light modulator 1 thus constructed and an image was written therein with a writing light having a wavelength of 700 nm. By reading it with reading light, an image having a contrast ratio of 100:1 was obtained. The response time of this spatial light modulator 1 was such that the rise time of which the reading light intensity changes from 0% to 90% was 100 ms and the fall time of which the reading light intensity changes from 100% to 10% was 60 ms.

When this spatial light modulator 1 was operated at a temperature set to about 40° C., the rise time and the fall time are reduced to 40 ms and 30 ms respectively, while maintaining the contrast ratio of 100:1. Such values are adequately acceptable and it has been confirmed that the spatial light modulator 1 is well suited for a moving picture display. As mentioned, according to the second embodiment, it is possible to improve the response speed to light by setting the operating temperature of the spatial light modulator positively at a high value.

Third Embodiment

A third embodiment of the present invention will be described with reference to FIGS. 10 to 13. The third embodiment relates to conditions of the film thickness and the light absorption coefficient of the photoconductive member 18. A construction of a spatial light modulator of the third embodiment referred to as numeral 1 is the same as that of the first embodiment.

As mentioned previously, the impedance of the photoconductive member 18 depends upon the intensity of writing light. In this regard, it is preferable in view of high sensitivity that a photoconductive member 18 has an impedance characteristic which varies considerably even with a low intensity light. Hydrogenated amorphous silicon and amorphous silicon carbide are typical examples exhibiting such impedance characteristics.

Figure 10:
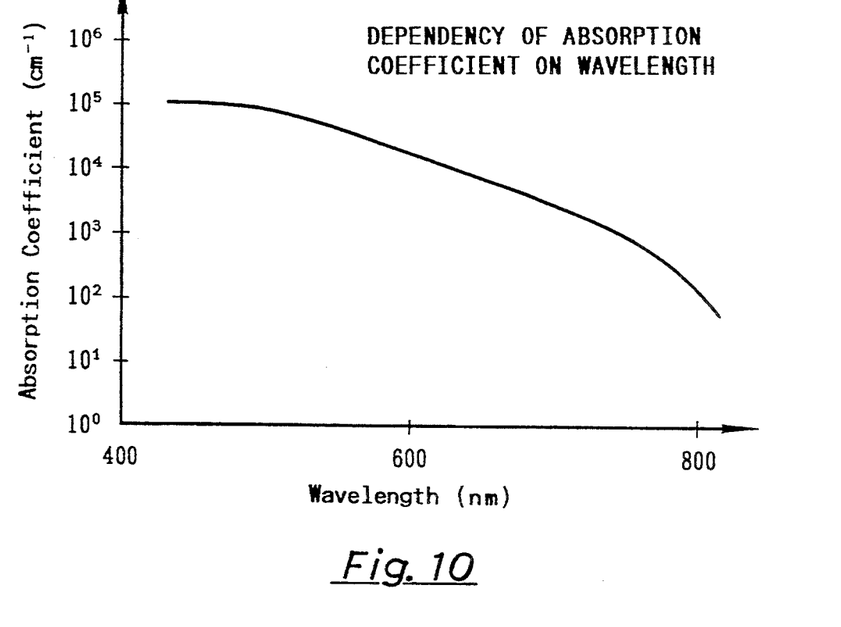
FIG. 10 is a graph showing a dependency of absorption coefficient of hydrogenated amorphous silicon on a wavelength of light.

FIG. 10 is a graph showing a dependency of absorption coefficient of the photoconductive member 18 of hydrogenated amorphous silicon on a wavelength of light. As is clear from FIG. 10, the absorption coefficient increases with a decrease of the wavelength of writing light.

Figure 11:
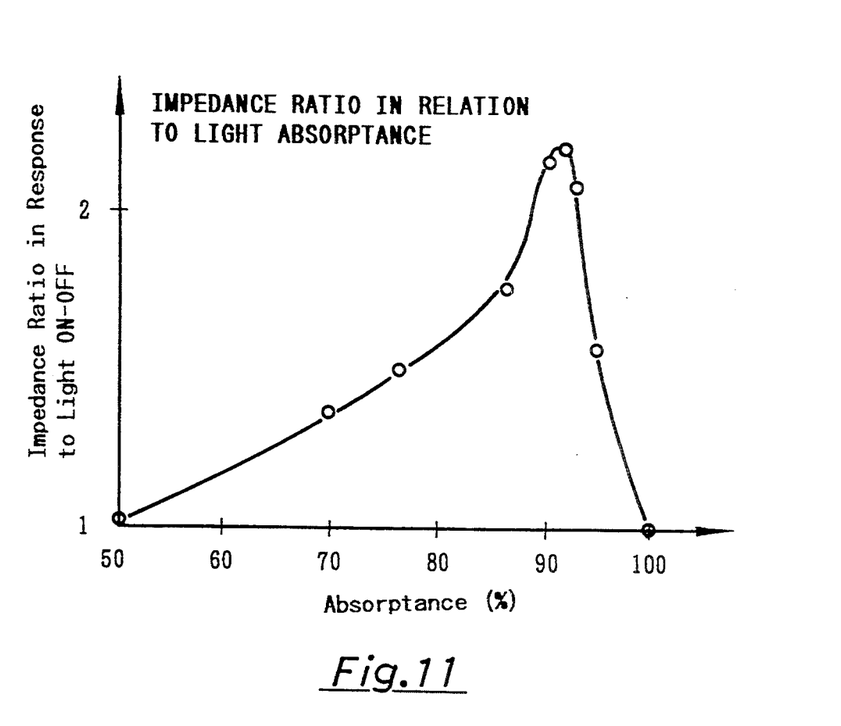
FIG. 11 is a graph showing a relation between a light absorptance of hydrogenated amorphous silicon and an impedance ratio thereof in bright and dark conditions.

It might be presumed that the larger the absorption of the writing light is the larger the impedance variation of the photoconductive member. However, the fact is not so. FIG. 11 is a graph showing a relation between the writing light absorptance and the impedance change ratio responsive to bright and dark conditions of the photoconductive member 18. This graph was obtained for hydrogenated amorphous silicon by using a writing light having a wavelength of 700 nm and the driving power source frequency of 1 kHz.

However, similar tendency was obtained for other material such as amorphous silicon carbide a—$Si_xC_{1-x}$:H (x<1). In this graph, absorptance on abscissa corresponds mainly to the film thickness of the photoconductive member 18.

As shown in this graph, the absorptance and the impedance ratio correspond to each other to some extent, so that the impedance variation hence the sensitivity of the photoconductive member increases with the increase of writing light absorptance. However, when the absorptance increases beyond the extent, the writing light is absorbed on the surface side of the photoconductive member 18 (on the side where the writing light is incident to) and intensity thereof is reduced as the light advances deep toward the photo modulation layer 22. From the principle of impedance change due to generation of electric charge by photoelectric conversion, the impedance change of the photoconductive member is small in the deep portion of the photoconductive member 18 where only a weak light reaches. Considering the impedance change in the whole layer of the photoconductive member 18, in other words, impedance change hence the sensitivity thereof is lowered in the deep portion of the photoconductive member 18 where it does not react to the incident light effectively.

From the foregoing, in order to improve the sensitivity of the photoconductive member 18, the thickness thereof should be selected such that the absorptance thereof to the incident light becomes in the order of 70 to 95%, preferably about 90%. This range of absorptance corresponds to the impedance ratio not less than 1.5. This embodiment is based on this fact and proves that the sensitivity is improved by adjusting the film thickness of the photoconductive member 18 independently from the photo modulation member 22.

Now an explanation is given to a sample of the spatial light modulator prepared according to this embodiment. As a photoconductive layer 18, a film of hydrogenated amorphous silicon doped with boron in atomic percent of 0.4 ppm with respect to the silicon therein is formed on the first substrate 10 having an ITO layer by plasma CVD. The thickness of the hydrogenated amorphous silicon film was 18 μm. With this value of thickness, the light absorptance thereof for writing light emitted from an LED light source and having a wavelength of 700 nm becomes about 90%. Then, a dielectric mirror layer 20 composed of a lamination of a total of 13 silicon and silicon dioxide layers laminated alternately by vapor deposition was formed on the hydrogenated amorphous silicon film.

Then, components of the first substrate 10 having the above dielectric mirror layer 20 and the second substrate 12 having an ITO layer thereon were deposited by angled evaporation with silicon dioxide (SiO$_2$) films respectively, thereafter, an aligning film of silane coupling agent "AY43-021" available from Toray Daw Corning Silicone Inc. was formed on each of the components.

Subsequently, the two components respectively supported on the first and second substrates 10 and 12 were assembled with spacers 28 and 30 to form a cell of 3 µm thick which was filled with liquid crystal "MJ911393" available from Merck Japan Inc., resulting in a sample 1 of the third embodiment.

On the other hand, a sample 2 which was similar to the sample 1 except that the hydrogenated amorphous silicon film had a thickness of 10 µm was made for comparison purpose.

Figure 12:
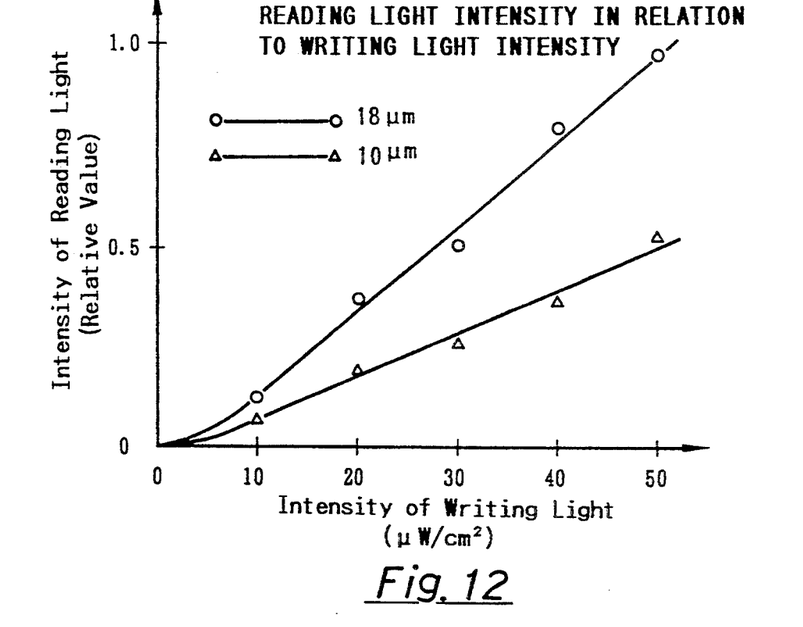
FIG. 12 is a graph showing a relation between a writing light intensity and a reading light intensity of spatial light modulator samples 1 and 2 of a third embodiment of the present invention.

An A.C. voltage having a rectangular waveform and a driving frequency of 10 kHz was applied to the samples 1 and 2 and a relation of intensity between the writing light and the outputted reading light was investigated by writing an image with an LED light having a wavelength of 700 nm and reading the image with a reading light. The result is shown in FIG. 12. As is clear from FIG. 12, the output intensity of the reading light for the sample 1 having the hydrogenated amorphous silicon film of 18 µm thick is about twice that of the sample 2 having the hydrogenated amorphous silicon film of 10 µm thick and thus the sensitivity of the spatial light modulator sample 1 is twice that of the sample 2.

As another sample, a hydrogenated amorphous silicon film doped with boron in atomic percent of 0.4 ppm with respect to the silicon was formed on a first substrate 10 having an ITO layer thereon by plasma CVD. The thickness of the hydrogenated amorphous silicon film was 10 µm. Then, a dielectric mirror layer 20 composed of a total lamination of 13 silicon and silicon dioxide layers formed alternately by vapor deposition was formed on the hydrogenated amorphous silicon film.

Then, components of the first substrate 10 having the above dielectric mirror layer 20 and the second substrate 12 having an ITO layer thereon were deposited by angled evaporation with silicon dioxide (SiO$_2$) films respectively, thereafter, an aligning film of silane coupling agent "AY43-021"0 available from Toray Daw Corning Silicone Inc. was formed on each of the components.

Subsequently, the two components respectively supported on the first and second substrates 10 and 12 were assembled with spacers 28 and 30 to form a cell of 3 µm thick which was filled with liquid crystal "MJ911393" available from Merck Japan Inc., resulting in a sample 3 of the third embodiment.

Figure 13:
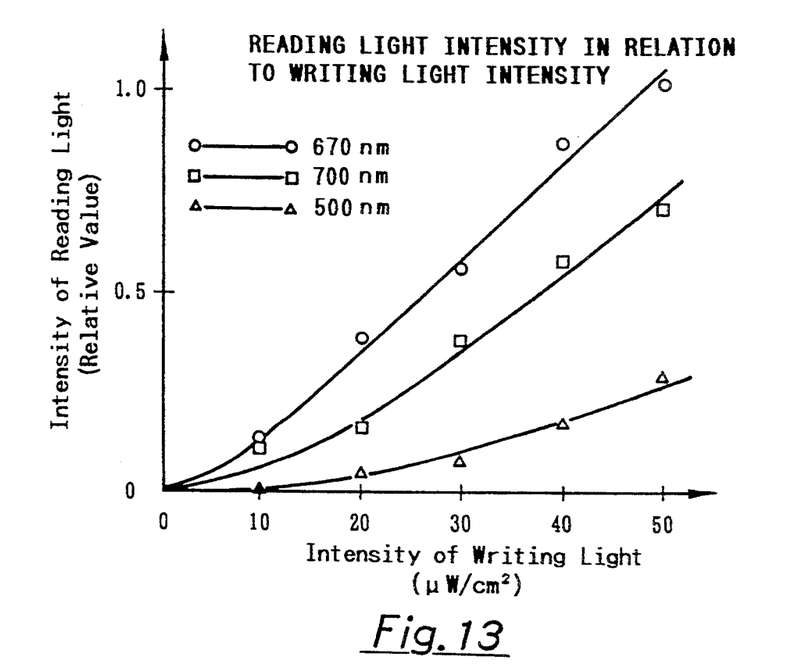
FIG. 13 is a graph showing a relation between a writing light intensity and a reading light intensity in a spatial light modulator sample 3 of the third embodiment of the present invention when a wavelength of the writing light is changed.

An A.C. voltage having a rectangular waveform and a driving frequency of 10 kHz was applied to the sample 3 and a relation of intensity between writing light and outputted reading light was investigated similarly to the case of the samples 1 and 2 with using three kinds of writing light. First writing light was a laser beam emitted from a semiconductor laser and having a wavelength of 670 nm at which absorptance of hydrogenated amorphous silicon was about 90%. Second writing light was a light emitted from an LED and having a wavelength of 700 nm at which the absorptance was lower than 90%. Third writing light was a filtered white light having a wavelength of 500 nm at which the absorptance was higher than 90%. Results are shown in FIG. 13. It is clear from FIG. 13, that, when the writing light having the wavelength of 670 nm at which the absorptance of hydrogenated amorphous silicon is 90% is used, the sensitivity becomes maximum. The sensitivity is lower with the writing light whose absorptance is higher or lower than 90%.

It is possible to make the sensitivity of a spatial light modulator higher independently from the photo modulation layer by adjusting the film thickness of the photoconductive member to a value corresponding to the writing light wavelength to be used or by selecting a writing light wavelength corresponding to the thickness of the photoconductive member to be used so that the latter absorbs 70 to 95% of the writing light.

Other Embodiments

The present invention is not limited to the described embodiments and the following embodiments fall within the scope of the present invention:

(1) A modification of any of the described embodiments, in which a light blocking layer containing CdTe, Si, Ge and/or B is provided between the dielectric mirror layer 20 and the photoconductive member 18.

(2) A modification of any of the described embodiments, in which, instead of the nematic liquid crystal, other material such as liquid crystal dispersed polymer, for instance, a hybrid field effect liquid crystal ((HFE) can be used as the photo modulation member.

(3) Any of the described embodiments can be applied to a still picture image display, although the present invention is generally directed to a moving image display.

(4) A modification of any of the described embodiments, in which the photoconductive member is formed of hydrogenated amorphous silicon containing a certain amount (in the order of a few percent in atomic percent) of carbon, nitrogen and/or oxygen.

(5) The third embodiment combined with the first and/or second embodiment. For example, the samples prepared according to the third embodiment satisfy the conditions in the first embodiment in terms of film thickness and amount of boron dopant. Particularly, it is possible to obtain a very satisfactory sensitivity characteristics when the film thickness of the photoconductive member of hydrogenated amorphous silicon is selected from a range from 10 µm to 30 µm and the writing light absorptance of the member being in the range from 70% to 95%.

According to the spatial light modulator of the present invention, the following advantages are obtained:

(1) Since the photoconductive member is formed from a hydrogenated amorphous silicon film having a thickness of 10 µm to 30 µm and doped with boron in atomic percent thereof to silicon in the film at a rate of 0.1 ppm to 1.0 ppm, a good contrast and resolution can be obtained on even a moving picture without an afterimage effect.

(2) Since the photoconductive member is prepared such that it absorbs 70% to 95% of writing light, it is possible to improve the sensitivity.

(3) Since the photoconductive member is formed of hydrogenated amorphous silicon, and has the thickness optimum to absorb 70% to 95% of the writing light and is doped with boron such that the amount of the boron with respect to silicon therein 0.1 to 1.0 ppm in atomic percent, an acceptable contrast ratio and resolution are obtained without an after-image effect even for a moving image display.

What is claimed is:

1. A spatial light modulator having a pair of transparent electrodes for generating a driving electric field therebetween and at least a photoconductive member and a photo modulation member laminated and interposed between said pair of transparent electrodes, and information being written in said spatial light modulator by irradiating said photoconductive member with a writing light carrying said information, said photoconductive member being made of hydrogenated amorphous silicon doped with boron such that an amount of boron with respect to silicon in said hydrogenated amorphous silicon in atomic percent is above 0.1 ppm and less than 1.0 ppm, said information being read out of said spatial light modulator by irradiating said photo modulation member with a reading light, wherein a thickness of said photoconductive member is selected to have light absorptance ranged 70% to 95% at a wavelength of said writing light.

* * * * *